US008866320B2

(12) United States Patent
Perregrini

(10) Patent No.: US 8,866,320 B2
(45) Date of Patent: Oct. 21, 2014

(54) INTEGRATED GENERATOR DEVICE FOR PRODUCING ENERGY FROM ZERO-EMISSION RENEWABLE ALTERNATIVE SOURCES RESPECTING AND PRESERVING THE ENVIRONMENT

(76) Inventor: Vittorio Perregrini, Ascona (CH)

( * ) Notice: Subject to any disclaimer, the term of this patent is extended or adjusted under 35 U.S.C. 154(b) by 728 days.

(21) Appl. No.: 13/125,852

(22) PCT Filed: Oct. 23, 2009

(86) PCT No.: PCT/IB2009/007206
§ 371 (c)(1),
(2), (4) Date: Apr. 25, 2011

(87) PCT Pub. No.: WO2010/046767
PCT Pub. Date: Apr. 29, 2010

(65) Prior Publication Data
US 2011/0204644 A1   Aug. 25, 2011

(30) Foreign Application Priority Data

Oct. 24, 2008  (CH) .................................. 1676/08

(51) Int. Cl.
| | |
|---|---|
| *F03B 13/10* | (2006.01) |
| *F03B 13/12* | (2006.01) |
| *F03D 9/02* | (2006.01) |
| *F03D 9/00* | (2006.01) |

(52) U.S. Cl.
CPC ................ *F03D 9/008* (2013.01); *Y02E 10/38* (2013.01); *Y02E 10/72* (2013.01); *F05B 2240/93* (2013.01); *F03D 9/02* (2013.01)
USPC .................... 290/42; 290/44; 290/53; 290/54

(58) Field of Classification Search
CPC ....... F03D 9/008; F03D 9/02; F05B 2240/92; Y02E 10/72
USPC .............. 290/44, 55, 42, 53, 54; 60/495, 496, 60/497, 498, 501
See application file for complete search history.

(56) References Cited

U.S. PATENT DOCUMENTS

| | | | | |
|---|---|---|---|---|
| 4,035,659 | A | * | 7/1977 | Jeppson .......................... 307/84 |
| 4,159,427 | A | * | 6/1979 | Wiedemann .................... 290/55 |

(Continued)

FOREIGN PATENT DOCUMENTS

| | | |
|---|---|---|
| DE | 10064472 | 6/2002 |
| JP | 2004-19537 | 1/2004 |
| WO | 2007140583 | 12/2007 |

*Primary Examiner* — Julio C. Gonzalez
(74) *Attorney, Agent, or Firm* — Young & Thompson

(57) ABSTRACT

An energy generator for generating energy from renewable alternative sources, includes: a flotable platform adapted to be partially immersed in a fluid; a tower element arranged on the platform and including at least one wind generator for collecting wind energy and converting the same into electric energy, at least one first energy accumulator and at least one inverter. The energy generator further includes at least one system for storing and converting mechanical energy; the system for storing and converting mechanical energy including at least one charge mechanical accumulator, at least one flywheel balance coupled with the charge mechanical accumulator and a device for converting mechanical energy into electric energy. The wave motion or the stream of fluid where the platform is immersed determines an oscillating movement of the platform, of the tower element and of the at least one balance to charge the mechanical accumulator, which in turn releases the energy produced by its movement to the device for converting mechanical energy.

17 Claims, 8 Drawing Sheets

(56) References Cited

U.S. PATENT DOCUMENTS

| | | | | |
|---|---|---|---|---|
| 4,196,591 A | * | 4/1980 | Wallace | 60/497 |
| 4,206,608 A | * | 6/1980 | Bell | 60/698 |
| 4,266,143 A | * | 5/1981 | Ng | 290/53 |
| 4,316,704 A | * | 2/1982 | Heidt | 417/100 |
| 5,512,787 A | * | 4/1996 | Dederick | 290/4 R |
| 6,294,844 B1 | * | 9/2001 | Lagerwey | 290/55 |
| 7,397,144 B1 | * | 7/2008 | Brostmeyer et al. | 290/53 |
| 8,405,242 B2 | * | 3/2013 | Borden et al. | 290/55 |
| 2002/0182946 A1 | * | 12/2002 | Tanaka | 440/6 |
| 2003/0168864 A1 | * | 9/2003 | Heronemus et al. | 290/55 |
| 2005/0218657 A1 | | 10/2005 | Weesner et al. | |
| 2006/0232075 A1 | * | 10/2006 | Fraenkel | 290/54 |
| 2007/0228739 A1 | | 10/2007 | Kraczek | |

* cited by examiner

INTEGRATED GENERATOR DEVICE FOR PRODUCING ENERGY FROM ZERO-EMISSION RENEWABLE ALTERNATIVE SOURCES RESPECTING AND PRESERVING THE ENVIRONMENT

BACKGROUND OF THE INVENTION

1. Field of the Invention

The present invention refers to a generator for producing energy and particularly to a generator for producing energy from renewable alternative sources in a sustainable and eco-compatible form free from dangerous emissions, respecting the environment.

2. Description of the Related Art

Methods and devices for exploiting energy deriving from renewable sources (hydraulic energy, wind energy, energy from the sea, solar energy, geothermal energy, etc.) are known.

International patent application PCT/CA2007/000957 Abou-Raphael relates to an installation that exploits wave motion in a basin for actuating an hydraulic air compressor. Air is extracted from the air/water flow through a separator and compressed by the hydrostatic pressure determined by the is height difference between the upper water storage reservoir and the lower air separator, and upon release generates energy through suitable means. Such a system, besides being fixed, does not have a high efficiency, since it lacks complementarity with other renewable energy sources.

JP 2004-19537 YAMAGUCHI KO relates to an hybrid electric energy/heat generator, co-generation, comprised of a thermal solar collector generating a spiral hot air flow which is converted into rotational energy by a wind turbine coupled with a generator for conversion into electric energy. The wind direction is changed by means of cyclone ducts. The installation can be housed in a tubular element and placed in urban areas without much inconvenience. Moreover, the thermal radiation beam can be used at the same time for producing thermal energy (cogeneration). Besides combining just two renewable energy conversion devices of the conventional type, the only advantageous feature seems to be camouflage in urban areas and noise reduction.

US 2005/0218657 Wessner, MacMillan relates to a device for energy generation which is portable and can be disassembled, comprised of a transportable (towable) wind energy generator, in addition also a solar panel, coupled with an electric energy generator and means for storing the electric energy into a battery.

Such a known system for producing electric energy, which is very conventional, has the feature that it can be disassembled and transported.

The Applicant has further noted that none of the proposed solutions provides for a multiple integrated system capable of managing simultaneously the different renewable energy sources with no environmental impact, thanks both to the total absence of harmful emissions (no-carbon technology), and to the high efficiency, energy output/installation volume-cubage, compared to the space taken.

The Applicant has further noted that none of the proposed solutions has a high effectiveness in terms of energy output/energy cost and/or energy output/installation cost.

SUMMARY OF THE INVENTION

The Applicant has found that the abovementioned problems can be solved with a generator that combines a wind generation system with at least one system for accumulating and converting mechanical energy; on a flotable platform.

Therefore, in a first aspect thereof, the invention refers to an energy generator for generating energy from renewable alternative sources, comprising:

a flotable platform adapted to be partially immersed in a fluid;

a post element arranged on said platform and comprising at least one wind generator for collecting wind energy and converting the same into electric energy, at least one energy accumulator and at least one inverter;

characterised in that said energy generator further comprises at least one system for storing and converting mechanical energy; said at least one system for storing and converting mechanical energy comprising at least one charge mechanical accumulator, at least one flywheel balance coupled with said charge mechanical accumulator and a device for converting mechanical energy into electric energy;

the wave motion or the stream of fluid wherein the platform is immersed determining an oscillating movement of said platform and of the said tower element and thus of the balance for charging the charge mechanical accumulator, which releases the energy produced by its movement to said device for converting mechanical energy into electric energy.

The integration of the energy production means of the generator according to the present invention allows an almost constant power output to be obtained independently of weather conditions.

Moreover, the generator according to the present invention allows the installation to be easily placed and fit within natural and architectural environments, additionally performing and providing complementary social and commercial functions. In fact, different businesses, for commerce, tourism, advertising, sport, etc. can be based within such a generator.

Moreover, by combining the different energy sources and their accumulation, such an installation avoids fluctuations in the supply flows, keeping them substantially constant, complementing the different energy sources with each other and integrating, when lacking, the energy produced by one source with the energy produced by another source, in addition to the various possibilities of different kinds of accumulation and storage of the same produced energies.

The generator suitably further comprises at least one second energy accumulator and at least one first turbine arranged under the platform and immersed for capturing the stream motion of the fluid wherein the said platform is floating and converting it into a rotary motion of the same so as to produce electric current and release it to said second energy accumulator.

The technology proposed by the generator of the present invention therefore provides for a non-polluting energy production without attendant production of greenhouse gases, also called "carbon free". In fact, by using energy from natural renewable sources, this is the best way to help reducing carbon dioxide $CO_2$ emissions and to limit the environmental impact of the present climate changes.

Moreover, the generator according to the present invention is adapted to be located on rivers, lakes, seas even in off-shore units.

Advantageously, the energy generator according to the present invention could be used for producing clean energy in farming, industrial, housing, residential, commercial, tourist units autonomously without the assistance of external supply sources.

Alternatively, the generator according to the present invention could also be used for producing clean energy in watercraft units, such as ships, platforms, etc., independently and autonomously without resorting to fuels from sources that are non-renewable and/or are renewable but cause greenhouse effect and/or are polluting.

According to another advantageous aspect, the generator according to the present invention could also be used for producing clean energy in remote unserved areas, and as fallback supply source in emergency or rescue cases.

Advantageously, the generator comprises covering elements for converting solar energy connected to at least one current accumulator.

Preferably, the covering elements for converting solar energy comprise solar panels and/or photovoltaic cells, at least one load controller connected to said panels and/or photovoltaic cells and at least one current accumulator connected to the charge controller.

The generator suitably comprises a system for generating and converting potential/electric energy comprising:

at least one basin for collecting rainwater or water flowing back from the water surface;

at least one hydrostatic pressure and flow rate reservoir connected to the said collection basin and arranged at the top of said tower element;

at least one second turbine and at least one duct for conveying the rainwater collected in the said basin and/or in the hydrostatic pressure reservoir to the turbine for generating electric energy from potential energy of water collected in the hydrostatic pressure reservoir arranged on the top of the tower element.

At least one third energy accumulator connected to the second turbine.

Preferably, the generator further comprises at least one delivery duct connected to the hydrostatic pressure reservoir and at least one water delivery pump coupled with the delivery duct which draws form the fluid wherein the platform is floating for feeding water to the hydrostatic pressure reservoir and/or to the collection basin.

Advantageously, for increasing the energy production efficiency the delivery duct has a vertical extension shorter than the vertical extension of the duct for conveying the rainwater collected in the basin and/or in the reservoir to the turbine.

Suitably, the delivery pump is an electric pump powered by the energy surplus produced by the wind generator and/or by the system for generating and converting mechanical energy and/or by the covering elements for converting solar energy.

Moreover, the generator of the present invention is capable of self-rescuing in the event of storm or difficult circumstances, the platform can fill itself with water and sink as well as can drain itself and emerge when the danger is passed away. For this purpose, advantageously, the generator comprises a device for sinking and emersion comprising at least one floodable reservoir, whose filling determines the at least partial immersion of the platform, and at least one drain pump of the flooding reservoir for the emersion of the platform.

Preferably, the generator further comprises an anchoring device.

Advantageously, the anchoring device comprises at least one cable for anchoring the platform, to a fixed or movable point, and at least one aid winch that actuates the cable so as to move the platform vertically upwards or downwards.

To increase the stability of the generator, the platform comprises stabilising keels extending perpendicularly under the platform.

The platform suitably comprises:

at least one sector deformable like a bellows, which undergoes extensions and compressions due to the action of the wave motion for sucking and compressing air;

at least one storage reservoir for the compressed air, said air actuating at least one air turbine when suitably released;

at least one check valve connected to the said sector and to the said reservoir to prevent backflow of the compressed air stored in said compressed air storage reservoir;

at least one air turbine.

Preferably, the wind generator comprises at least one vertical wind generator comprising at least one vertical blade.

Advantageously, the blade is made of carbon fibre.

Alternatively, the generator comprises at least one oscillator arranged at the upper end of the tower element which converts the potential energy provided by the oscillation of the tower element determined by wave motion into electric energy, said oscillator being connected to an electric energy accumulator.

Preferably, the generator comprises at least one second wind generator arranged at the upper end of the tower element connected to at least one inverter and at least one accumulator.

Advantageously, at least the wind generator and/or the system for generating and converting mechanical energy and/or the covering elements for converting solar energy and/or the system for generating and converting potential/electric energy are connected together in parallel to form a single energy production and distribution unit.

The high integration of the energy production means of the generator of the invention allows an almost constant power output to be obtained independently of the weather conditions to which it is subjected.

For this purpose the generator comprises a plurality of switches and a control unit for operating the above systems and setting the same for connection, partialisation and disconnection or independent use.

Further characteristics and advantages of the present invention shall become clearer from the detailed description of some preferred, but not exclusive, embodiments of an energy generator for generating energy from renewable alternative sources, according to the present invention.

BRIEF DESCRIPTION OF THE DRAWING FIGURES

The description shall be made hereafter with reference to the accompanying drawings, provided only for indicating, and thus non limiting, purposes, wherein.

DETAILED DESCRIPTION OF THE INVENTION

Figure 1:
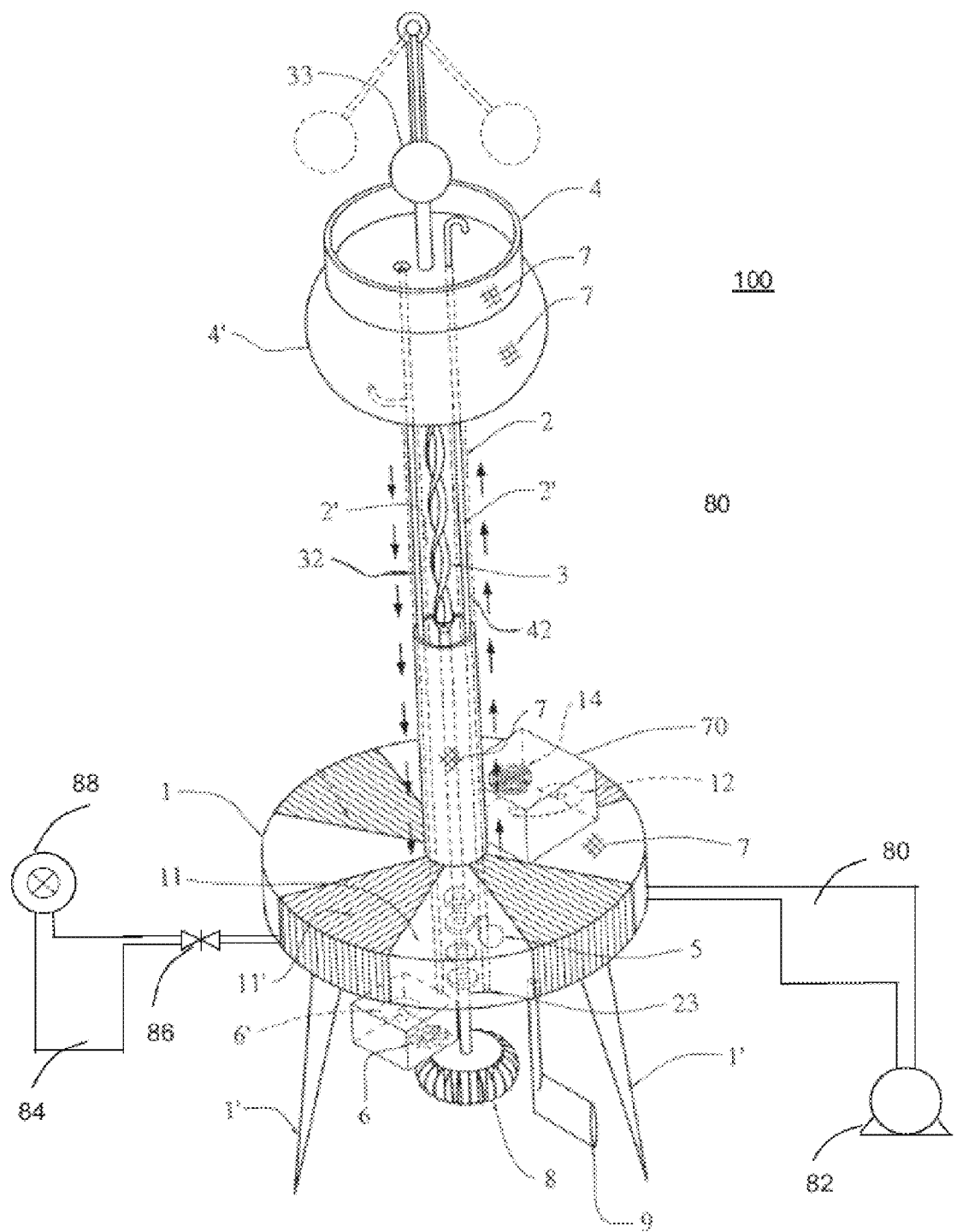
FIG. 1 is a perspective view of a preferred form of the energy generator for generating energy from renewable alternative sources according to the present invention.

Referring to FIG. 1, an energy generator for generating energy from renewable alternative sources according to the present invention is indicated with reference numeral 100.

As shown in FIG. 1, the generator comprises a flotable platform 1 adapted to be partially immersed in a fluid 10.

In the preferred embodiment, the platform 1 has circular shape, however other shapes are possible without departing from the scope of protection of the present invention.

For stabilising the platform 1 stabilising keels 1' extending under the platform are provided.

Preferably, there are 2 to 8 stabilising keels 1' depending on the size of the platform 1.

In the preferred embodiment there are three stabilising keels 1' arranged spaced apart along the perimeter of the platform 1. The stabilising keels 1' extend from the platform 1, tapering in the direction away the same.

On the flotable platform 1 there is in a central position a tower element 2 which extends vertically upwards. The tower element 2 is a hollow tubular element, open on a relevant portion of its extension for receiving a wind generator 3.

In the upper part, high on the tower element 2, there is a basin 4 for collecting rainwater attached to a hydrostatic pressure and flow rate reservoir 4'.

In the lower part of the tower element 2, i.e. on a portion less that 50% of the total length, the tower element 2 has the form of a hollow tubular element with circular section.

The open portion is comprised of two or more vertical ribs or uprights 2' depending on the structural needs and taking into account the efficiency of the wind generator 3, preferably two to four, said ribs 2' can also be shaped like an aerodynamic fin for better conveying air and increasing the efficiency of the wind blade(s).

The wind generator 3 for collecting wind energy is further connected to at least one energy accumulator and to at least one inverter. The wind generator 3 is preferably a generator with blade(s) having vertical axis and variable height, preferably between 6 and 25 mm, the air motion interacts with wind blade generator 3 and determines the rotation thereof for producing a current that is released to the energy accumulator.

The energy accumulator is an electric energy accumulator of known type, such as for example a battery.

Preferably, the vertical wind blade is made of carbon fiber because of the strength and lightness thereof.

According to an important aspect of the present invention, the energy generator 100 further comprises at least one system 70 for storing and converting mechanical energy.

According to an important aspect of the present invention, the energy generator 1 further comprises at least one system 70 for storing and converting mechanical energy.

The system for storing and converting mechanical energy comprising at least one charge mechanical accumulator 14, such as a spirally wound flat spring and at least one balance or flywheel 12, of the automatic clock type, coupled with the charge mechanical accumulator 14. The charge mechanical accumulator 14 being in turn coupled with at least one device for converting mechanical energy into electric energy.

The charge mechanical accumulator 14, charged by the movement of the balance 14, releases its energy for feeding the abovementioned at least one device for converting mechanical energy into electric energy, not shown in the figure.

The wave motion or the stream of fluid wherein the platform 1 is immersed determines an oscillating movement of the platform 1 and of the tower element 2 and thus of the balance 12 for charging the charge mechanical accumulator 14.

The latter releases the energy produced by its movement to said devices for converting mechanical energy into electric energy of known type and thus not presented in further detail in the description.

As mentioned above, on the top of the tower element 2 there is at least one basin 4 for collecting rainwater or water flowing back from the water surface, at least one hydrostatic pressure and flow rate reservoir 4'.

The basin 4 for collecting rainwater or water flowing back from the water surface and the hydrostatic pressure and flow rate reservoir 4' are connected through a duct 32 to a turbine 6, an alternator 6' and an energy accumulator.

The water flowing down in the duct 32 actuates the turbine 6, e.g. a turbine 6 of the Pelton type, which through the connection with the alternator 6' produces electric energy properly released to the energy accumulator, not shown in the figure.

Such hydraulic installation can be useful also for keeping constant the power output of the generator 100.

Connected to the collection basin 4 there is a delivery duct 42 which through at least one water delivery pump 5 which draws form the fluid 10 wherein said platform 1 is floating and feeds water to the basin 4 and/or to the reservoir 4' for exploiting the potential energy of the fall thereof.

For increasing the energy production efficiency the delivery duct 42 has a vertical extension shorter than the vertical extension of the duct 32 for conveying the rainwater collected in the said basin 4 and/or in the said reservoir to the turbine 6, for this purpose the turbine 6 is arranged a few meters under the platform 1.

The ducts 32, 42 are arranged on the ribs of the tower element 2, and can be installed thereon or "built-in".

The pump 5 is an electric pump that gets its energy from the possible electric energy surplus of the other production systems available on the generator 100.

Alternatively, the pump 5 is a pump with immersed board and powered by the fluid wherein the platform 1 is floating.

Therefore in this case the pump gets its energy from the wave motion, through the blade 9.

The wave motion or the possible surplus of produced energy actuates the pump 5 which draws from the fluid 10 for conveying the same through the duct 42 into the basin 4 for collecting rainwater, and into the reservoir 4' as well. On demand, the water while entering the descending penstock 32 feeds the hydraulic turbine 6, of the Pelton type, coupled with a current alternator 6' for producing further electric energy.

The generator 100 on the available surfaces where possible is provided with a system of covering elements 7 for converting solar energy which are connected to at least one current accumulator.

The system of covering elements 7 for converting solar energy comprises solar panels and/or photovoltaic cells connected to at least one charge controller and to at least one current accumulator, not shown in the figure.

The wind generator 3 can be integrated with the system of covering elements 7 for converting solar energy. In this case, the input of the inverter, which preferably is in common, is provided with an electric filtering device for limiting the maximum input power to the inverter and for adding the power from the wind generator 3 and from the system of covering elements 7 for converting solar energy.

Alternatively, the system of covering elements 7 for converting solar energy can be adapted to generate thermal energy.

In such a case the solar panels and/or photovoltaic cells are connected to thermal accumulators or boilers.

The solar panels and/or photovoltaic cells can advantageously be arranged on the outer surface of the basin 4 for collecting rainwater, of the hydrostatic pressure reservoir 4', of the ribs or uprights 2' and on the platform 1.

The generator suitably further comprises at least one second energy accumulator and at least one first turbine 8 arranged under the platform 1 and immersed for capturing the stream motion of the fluid 10 wherein the platform is floating and converting it into a rotary motion of the same so as to produce electric current and release it to the abovementioned second energy accumulator.

For this purpose the first turbine 8, supported by a shaft 23, is connected to an electric energy accumulator, such as a battery.

Advantageously, the wind generator 3 and/or the system 70 for generating and converting mechanical energy and/or the system of covering elements 7 for converting solar energy and/or the system for exploiting the potential energy of the water fall are connected together in parallel to form a single energy production and distribution unit.

Figure 6:
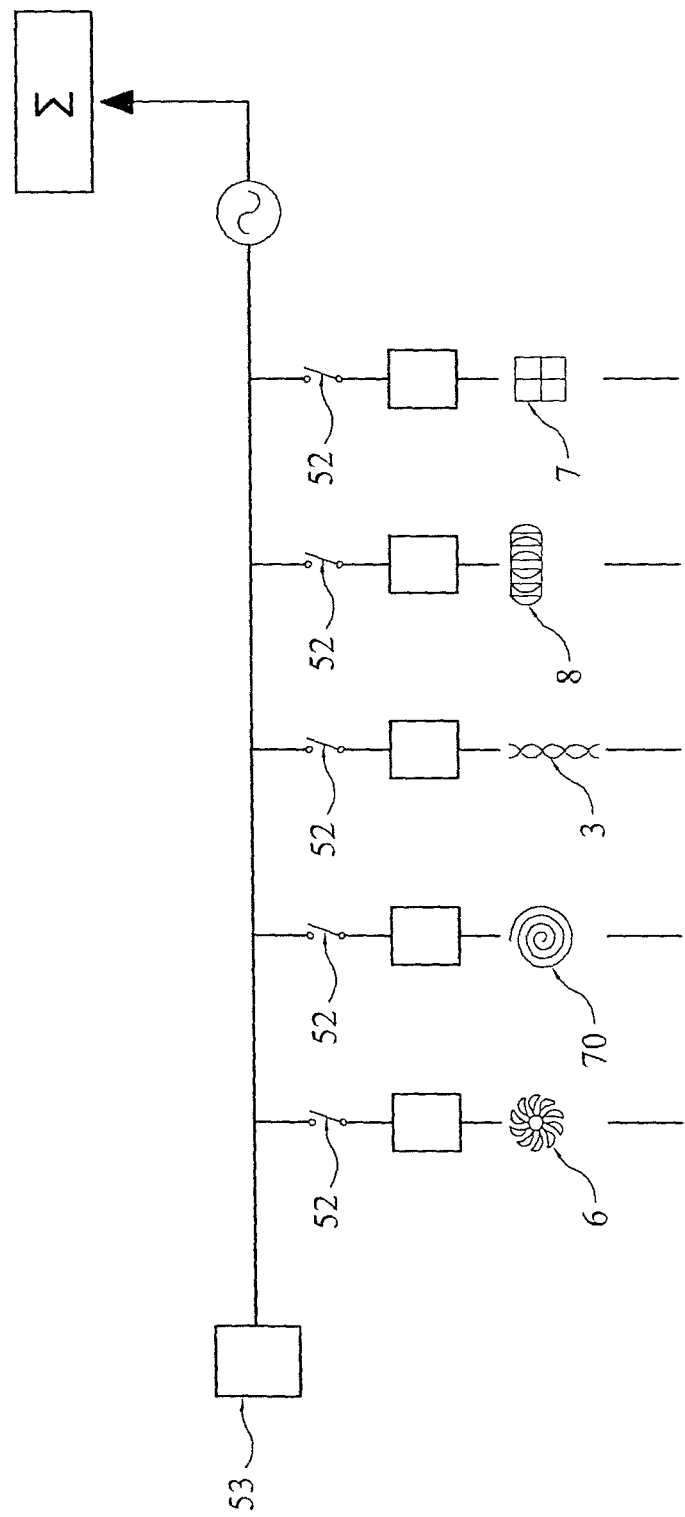
FIG. 6 is a layout diagram of an installation for combined or separated electric energy generation of some means for producing electric energy obtained from the corresponding conversion means.

For this purpose, the generator 100 comprises as shown in FIG. 6 a plurality of switches 52, one for each energy generation system, and a control unit 53 for operating the abovementioned systems and setting them for their connection, partialisation and disconnection or independent use.

A PLC can be used as a control unit.

The govern and control of the energy systems, through the PLC, are attended autonomously on-site by means of a set of programs predefined in the same PLC. However, for any variation in the operation or modification of such programs it is possible to operate remotely through means such GPS/modem or telecommunication means in general.

The energy generator also contemplates that the platform is provided with a device for sinking and emersion in addition to means for controlling the oscillation thereof and of the tower integral therewith. In fact, the generator of the invention is capable of self-rescuing in the event of storm or difficult circumstances, the platform being able to fill itself with water and sink as well as to drain itself and emerge when the danger is passed away.

For this purpose, the generator comprises a device for sinking and emersion comprising at least one floodable reservoir 80, whose filling determines the at least partial immersion of the platform 1, and at least one drain pump 82 of the flooding reservoir for the emersion of the platform.

Preferably, as shown in the figures, the generator comprises an anchoring device 54.

Advantageously, the anchoring device comprises at least one cable 26 for anchoring the platform and at least one aid winch 28 that actuates the cable so as to move the platform vertically upwards or downwards, thus assisting the device for sinking and emersion.

In the figure the cable 26 for anchoring the platform to a movable point is provided with an anchor 20'.

Alternatively, if a fixed anchoring is used, it is contemplated to bind the anchoring cable 26 at its lower end to a fixed point 20 in the bed of the water stream wherein the generator 1 is placed.

As shown in the figures, the generator 1 can further be provided with a device for controlling the oscillation of the platform and of the tower element.

The device for controlling the oscillation of the platform and of the tower element comprises and end ballast 50 fully immersed in the fluid under the platform 1 and connected thereto by means of telescopic rods 24 and a collector 27. The telescopic rod being actuated by hydraulic jacks, not shown.

In detail, the end ballast 50, which balance the tower element 2 and the platform 1, is rigidly connected with the same and its extension from the bottom of the platform can be set.

The end ballast 50 with its extension from the water surface 10 set by means of the telescopic rods 24 and by the hydraulic jacks allows the oscillation amplitude of the platform 1 and of the tower element 2 to be set, increasing or decreasing it for better exploiting the alternative energy sources.

If for example the wind is very favorable and strong it will be necessary to keep the oscillation small for better efficiency of the wind blade(s), and better safety of the installation, while on the contrary with mild wind it will be necessary to exploit the wave motion increasing as far as possible the tower oscillation.

According to an alternative embodiment, not shown in the figures, the platform 1 may comprise at least one sector deformable like a bellows, which undergoes extensions and compressions due to the action of the wave motion for sucking and compressing air.

In detail, the platform 1 may be formed by more sectors or slices, some of which are deformable like a bellows and undergo extensions and compressions due to the bellows action determined by wave motion, so as to suck and compress air in suitable compressed air reservoir 84 for pressure accumulation, a check valve 86 being between the reservoir 84 and the platform. The air so sucked and compressed is released, when necessary, for actuating air turbines 88, or air motors, or pneumatic pistons, for generating electric current.

In the preferred embodiment shown in FIG. 1, on the top of the tower element 2 above the basin 4 for collecting rainwater there is an oscillator 33 such as a pendulum. The oscillator 33 converts the potential energy provided by the oscillation of the tower determined by wave motion into electric/mechanical energy.

Figure 2:
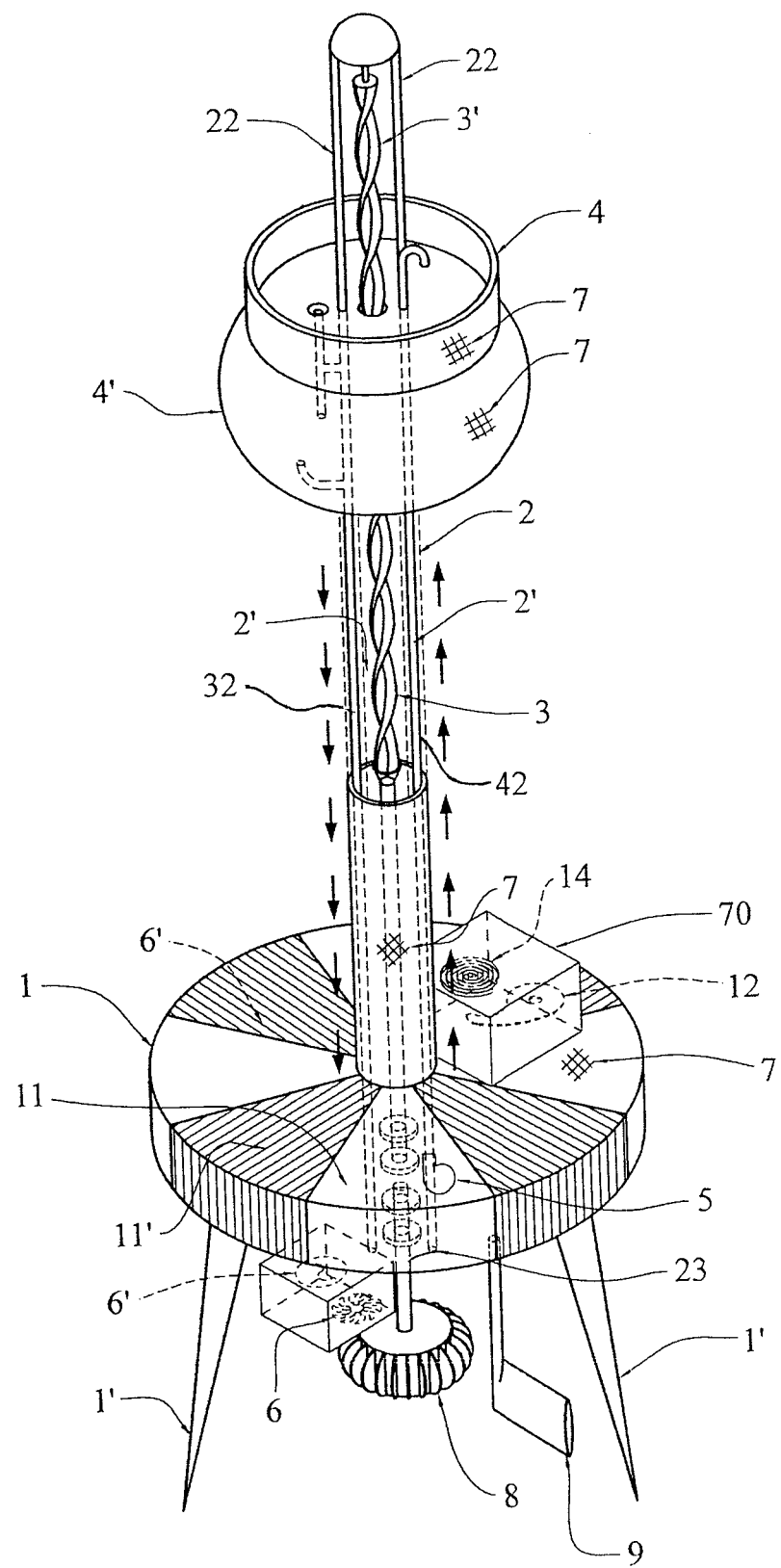
FIG. 2 is a perspective view of a second embodiment of the energy generator for generating energy from renewable alternative sources according to the present invention with the extension of the vertical axis wind blade on the top of the tower element of the generator itself.

In a different embodiment shown in FIG. 2, instead of the oscillator 33 a second wind turbine with vertical axis 3', either continuing or not the one 3 below, is arranged in the upper part of the tower element 2 of the generator 1 and is supported by proper ribs 22 which can be an extension of the ribs 2'.

Figure 3:
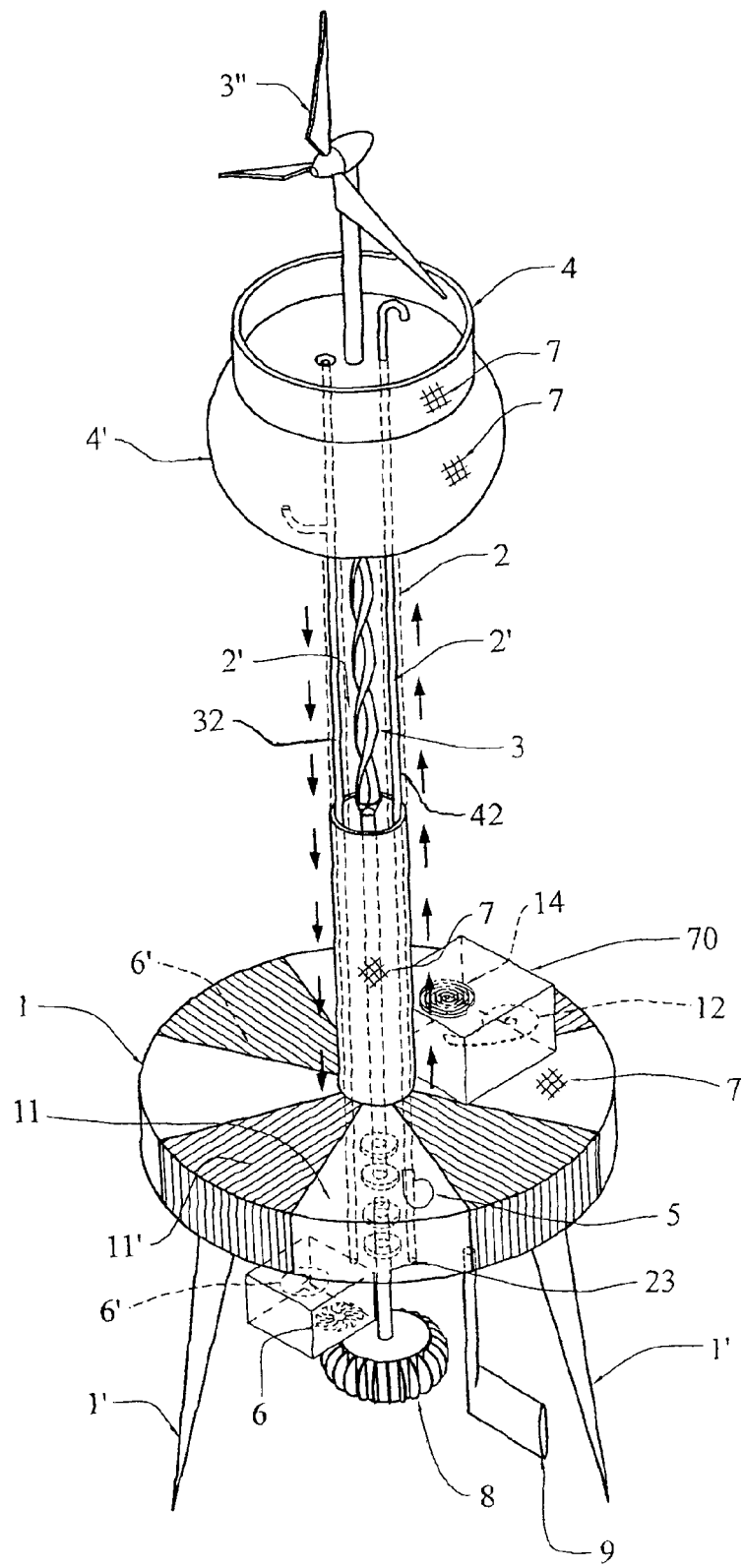
FIG. 3 is a perspective view of a second embodiment of the energy generator for generating energy from renewable alternative sources according to the present invention with a wind blade of traditional type with horizontal axis arranged on the top of the tower element of the generator itself.

In FIG. 3 a further alternative embodiment of the generator according to the present invention is shown which is totally similar to that of FIG. 1 apart from the fact that the installation of a second wind turbine with horizontal axis 3" is preferred.

Figure 4A:
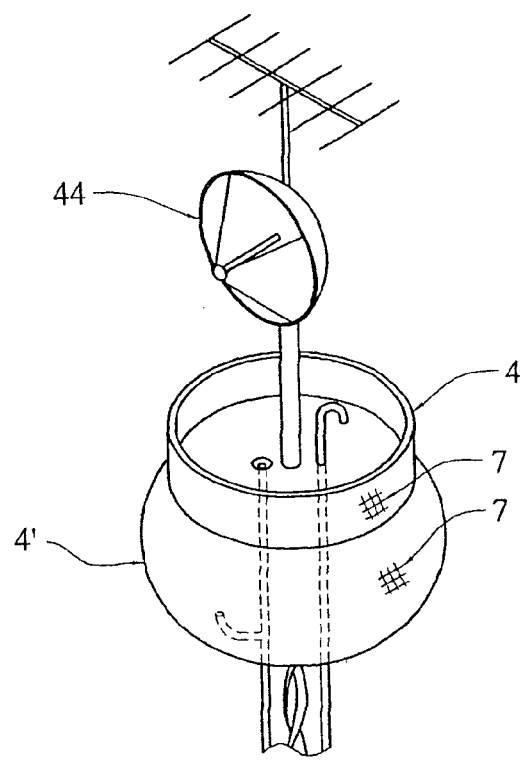
FIG. 4a shows the upper part of the generator wherein the installation of a telecommunication station is shown.

In FIG. 4a a further alternative embodiment of the generator according to the present invention is shown which is totally similar to that of FIG. 1 apart from the fact that the generator contemplates the installation of a telecommunication station (antennae, parabolic antenna, mobile phone, satellite) 44 on the top of the tower element 2.

Figure 4B:
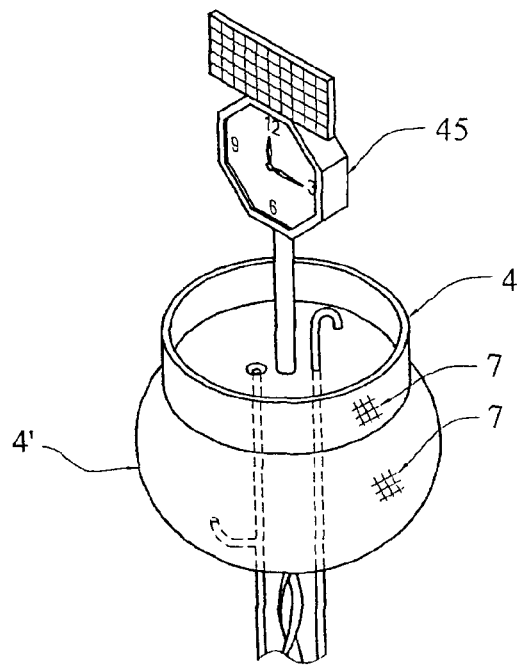
FIG. 4b shows the upper part of the generator used for installations for commercial, advertising, signalling or information purposes.

In FIG. 4b a further alternative embodiment of the generator according to the present invention is shown which is totally similar to that of FIG. 1 apart from the fact that it is contemplated to install a sea beacon and/or a station 46 for assisting maritime navigation.

Figure 4C:
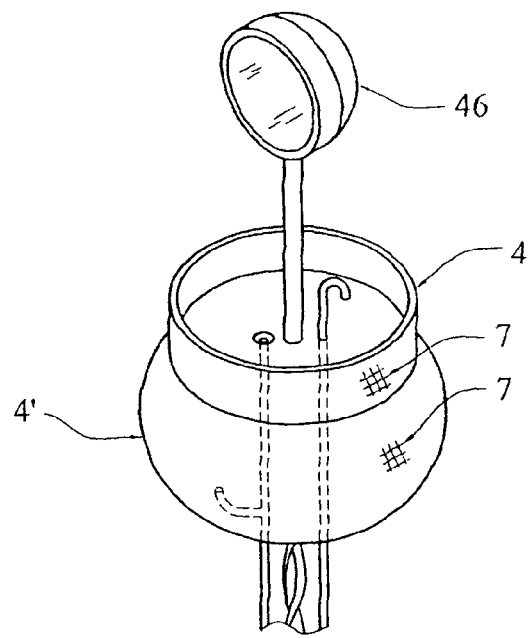
FIG. 4c shows the upper part of the generator wherein the installation of a station for assisting the navigation.

In FIG. 4c a further alternative embodiment of the generator according to the present invention is shown which is totally similar to that of FIG. 1 apart for the fact that it is contemplated to install a radar or a radar beacon 47 for assisting maritime/air navigation.

Figure 4D:
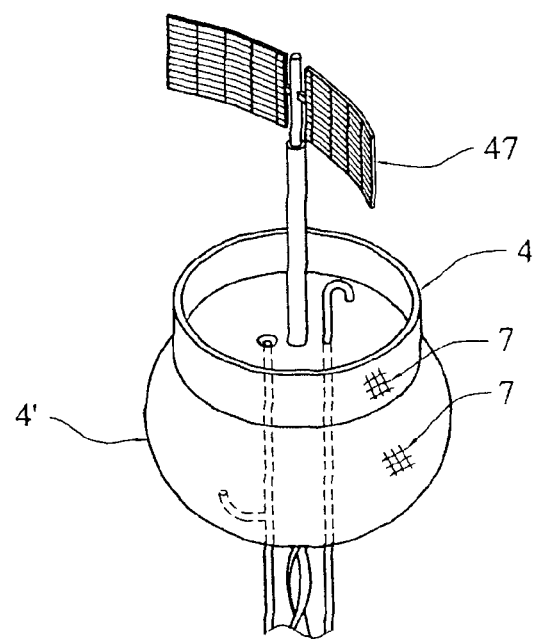
FIG. 4d shows the upper part of the generator wherein the installation a radar station is shown.
Figure 5A:
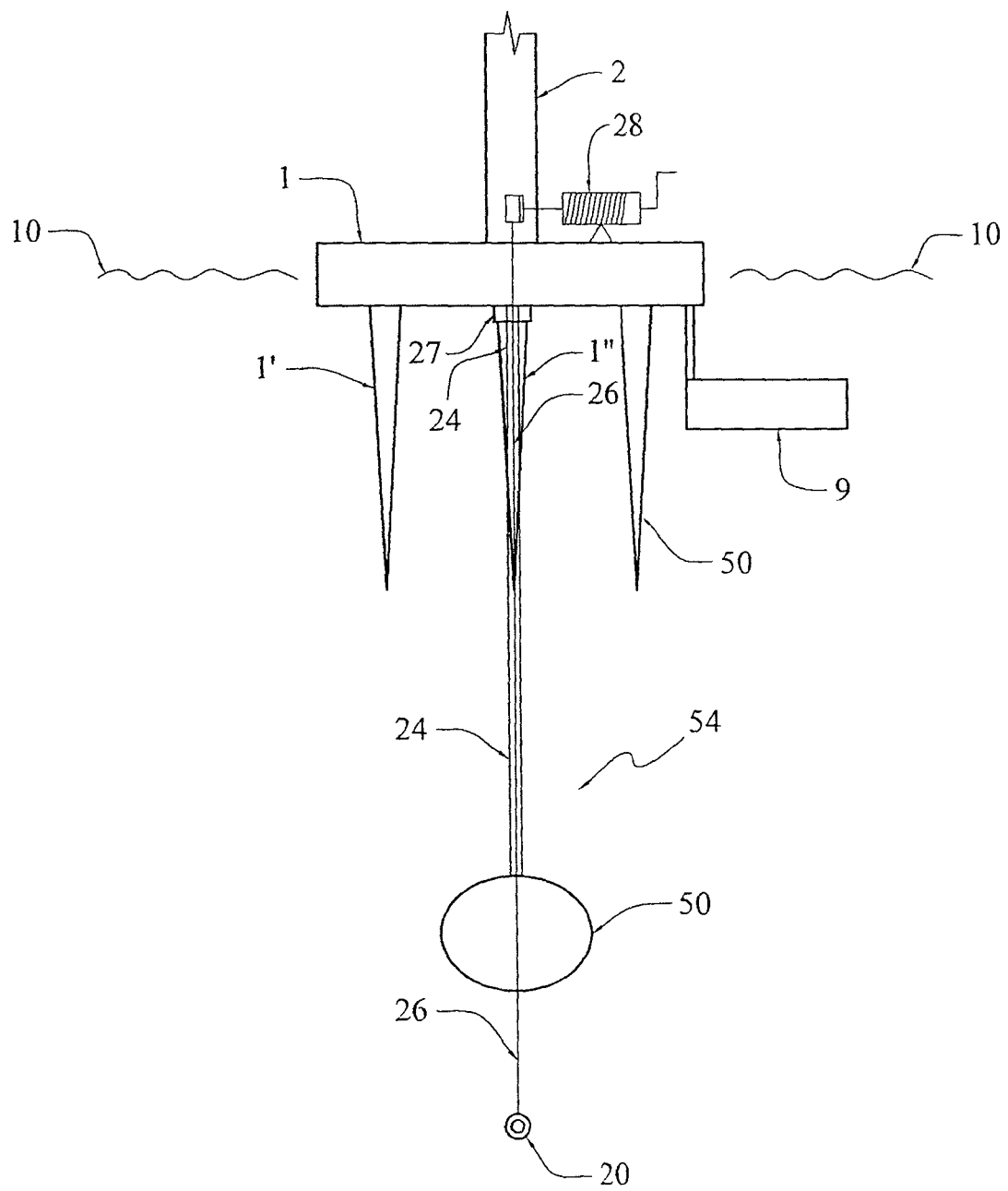
FIG. 5a shows the flotable platform with its lower part submerged and the setting, anchoring, sinking and emersion means in a fixed position.
Figure 5B:
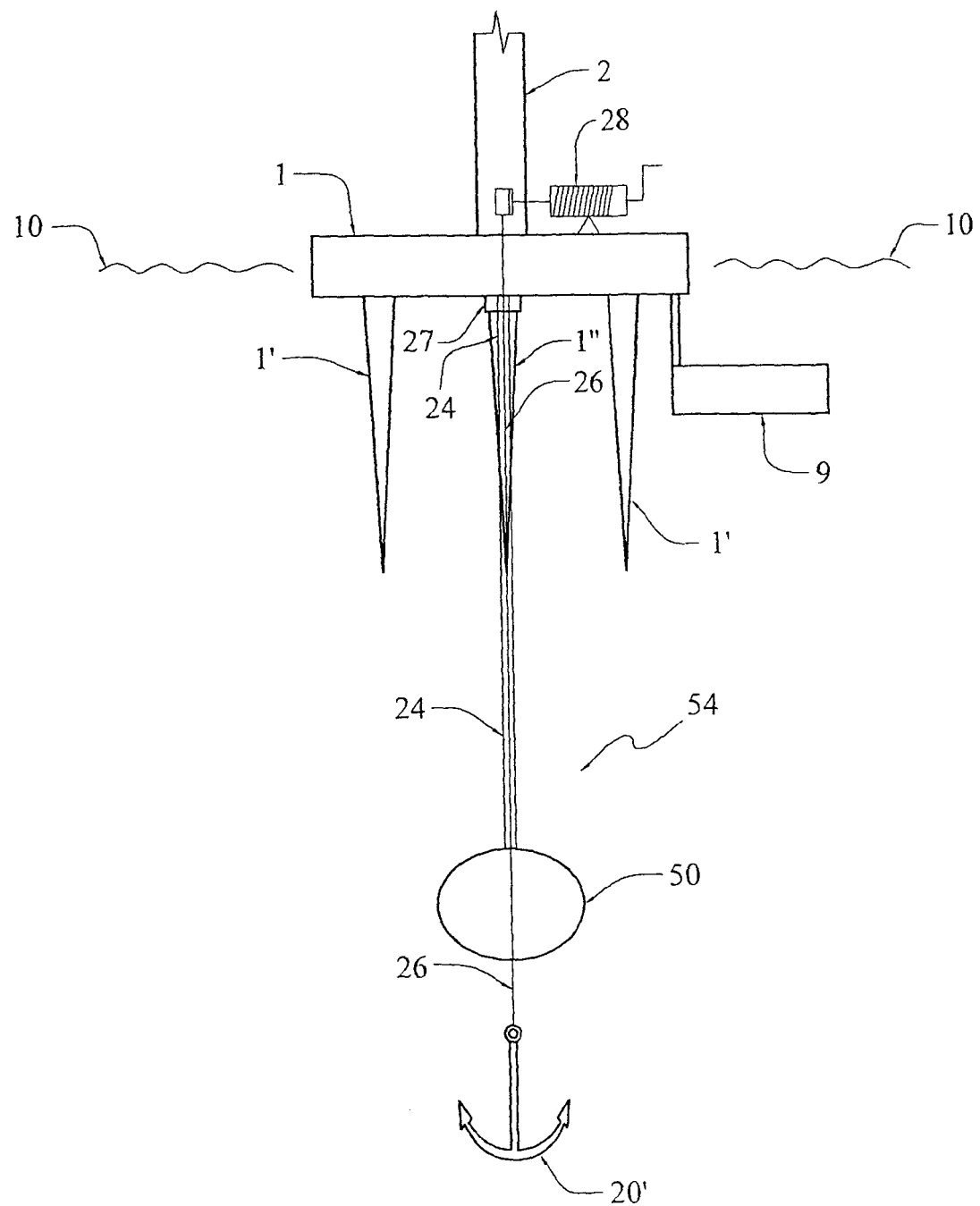
FIG. 5b shows the flotable platform with an alternative form of the lower part.

Finally, in FIG. 4d another embodiment of the present invention is shown which is intended for installation in tourist, urban or street areas and contemplates to install a clock and/or signs for advertising or informing, a calendar, a weather station, etc. 45 on the top of the tower element.

The generator of the invention may have several applications and uses, for example placed near dock urban areas, residential areas or areas by the shores, where, among other things, as a further feature, it can be very well placed without disturbing the natural, landscape and architectural environment.

The generator allows an easy inclusion and adaptation of the installation within natural and architectural environments, furthermore fulfilling and carrying out complementary social and commercial functions, since many different activities for commerce, tourism, advertising, sport, etc. can be located within such a generation installation.

It can be used as well for sustaining cultivations by the seaside or by a river shore by pumping water for irrigation and/or by lighting and heating farms, greenhouses or in general by supplying energy useful for agricultural and forest activities.

It can likewise produce clean energy in remote unserved areas (e. g. islands), and as a fallback supply source in emergency and rescue cases and centres.

The present generator is very well suited to carry out a support function as a reference point for maritime/air navigation, particularly as a radio beacon in isolated or off-shore areas.

It can be located on rivers, lakes, seas even in off-shore units.

Additionally, it can also function as an energy generator for off-shore oil prospection platforms, and it can be installed as a generator/propulsion means on ships and watercrafts, producing clean energy, in an independent autonomous form without using fuels from non renewable sources or renewable but polluting or not free from greenhouse effect (no carbon free) sources.

The energy generator 100 according to the present invention can have any size and capacity so as to be adapted to and compatible with the energy efficiency and intended use.

Moreover, the energy generator 100 contemplates also that the platform 2 has a hydrodynamic shape. The generator, object of the finding of the present invention, thus recycles natural energy in a way that ensures environment protection and preservation, does not cause any pollution, reduces the use of harmful energy sources which cause greenhouse gas emissions and warming, helps in the reclamation and cure of the environmental means and contributes to sustainable development.

The present invention has been described with reference to some embodiments thereof. Many modifications can be introduced in the embodiments described in detail, falling anyhow within the scope of protection of the invention, which is defined by the following claims.

As an example, the energy generator could contemplate that the platform 1 accommodates propellers self-alimented by the power produced by the different power generation devices installed, for moving and delocalizing the same autonomously without making use of power from external energy supply sources.

The invention claimed is:

1. An energy generator for generating energy from renewable alternative sources, comprising:
a floatable platform adapted to be partially immersed in a fluid, the floatable platform comprising:
at least one sector deformable like a bellows, which undergoes extensions and compressions due to action of wave motion for sucking and compressing air,
at least one storage reservoir for the air compressed by said at least one deformable sector, said air actuating at least one air turbine when suitably released, and
at least one check valve connected to said sector and to said reservoir for preventing backflow of the compressed air stored in said compressed air storage reservoir;
a tower element arranged on said floatable platform and comprising at least one wind generator for collecting wind energy and converting the wind energy into electric energy, at least one first energy accumulator and at least one inverter;
at least one system for storing and converting mechanical energy, said at least one system for storing and converting mechanical energy comprising at least one charge mechanical accumulator, at least one flywheel balance coupled with said charge mechanical accumulator and a device for converting mechanical energy into electric energy, wherein
wave motion or flow of fluid wherein said floatable platform is immersed causes an oscillating movement of said floatable platform, of said tower element and of said at least one balance for charging the mechanical accumulator, which in turn releases the energy produced by movement of the mechanical accumulator to said device for converting mechanical energy.

2. The generator according to claim 1, further comprising at least one first turbine arranged under said platform and fully immersed for capturing the flowing motion of the fluid wherein said platform is floating and converting the flowing motion into a rotary motion so as to produce electric current.

3. The generator according to claim 1, further comprising covering elements for converting solar energy connected to at least one current accumulator.

4. The generator according to claim 3, wherein said covering elements for converting solar energy comprise at least one of solar panels or photovoltaic cells, at least one load controller connected to said at least one panels photovoltaic cells and at least one current accumulator connected to said charge controller.

5. The generator according to claim 1, further comprising a device for sinking and emersion comprising at least one floodable reservoir, whose filling determines the at least partial immersion of said platform, and at least one drain pump of said at least one flooding reservoir for the emersion of said platform.

6. The generator according to claim 1, further comprising an anchoring device.

7. The generator according to claim 1, wherein said platform comprises at least two stabilising keels extending perpendicularly under said platform.

8. The generator according to claim 1, wherein said wind generator comprises at least one vertical wind generator comprising at least one vertical blade.

9. The generator according to claim 8, wherein said at least one vertical blade is made of carbon fiber.

10. The generator according to claim 1, further comprising at least one oscillator arranged at the upper end of said tower element which converts the potential energy provided by the oscillation of the tower element determined by wave motion into electric energy, said oscillator being connected to an electric energy accumulator.

11. The generator according to claim 1, further comprising at least one second wind generator arranged at the upper end of said tower element connected to at least one inverter and to at least one accumulator.

12. The generator according to claim 1, wherein in that at least said wind generator; said system for generating and converting mechanical energy, covering elements for converting solar energy are connected together in parallel to form a single energy production and distribution unit, and by comprising a plurality of switches and a control unit to be operated and set for the connection, partialization and disconnection or independent use of the single energy production and distribution unit.

13. An energy generator for generating energy from renewable alternative sources, comprising:
- a floatable platform adapted to be partially immersed in a fluid;
- a tower element arranged on said platform and comprising at least one wind generator for collecting wind energy and converting the wind energy into electric energy, at least one first energy accumulator and at least one inverter;
- at least one system for storing and converting mechanical energy, said at least one system for storing and converting mechanical energy comprising at least one charge mechanical accumulator, at least one flywheel balance coupled with said charge mechanical accumulator and a device for converting mechanical energy into electric energy;
- at least one basin for collecting rainwater or water flowing back from the water surface;
- at least one hydrostatic pressure and flow rate reservoir connected to said collection basin arranged at the top of said tower element;
- at least one second turbine comprising an electric generator; and
- and at least one duct for conveying the rainwater collected in said basin and/or in said reservoir to said turbine, wherein
- wave motion or flow of fluid wherein said platform is immersed causes an oscillating movement of said platform, of said tower element and of said at least one balance for charging the mechanical accumulator, which in turn releases the energy produced by movement of the mechanical accumulator to said device for converting mechanical energy.

14. The generator according to claim 13, further comprising:
- at least one delivery duct connected to at least one of said hydrostatic pressure reservoir or said collection basin; and
- at least one water delivery pump coupled with said delivery duct which draws from the fluid wherein said platform is floating for feeding water to at least one of said reservoir or said collection basin.

15. The generator according to claim 14, wherein said pump is an electric pump powered by at least one of the energy surplus of said wind generator or said system for generating and converting mechanical energy or of said covering elements for converting solar energy.

16. The generator according to claim 13, wherein said delivery duct has a vertical extension shorter than the vertical extension of said duct for conveying the rainwater collected in said basin or in said reservoir to said turbine.

17. The generator according to claim 13, wherein said platform comprises:
- at least one sector deformable like a bellows, which undergoes extensions and compressions due to the action of the wave motion for sucking and compressing air;
- at least one storage reservoir for the air compressed by said at least one deformable sector, said air actuating air turbines when suitably released; and
- at least one check valve connected to said sector and to said reservoir for preventing backflow of the compressed air stored in said compressed air storage reservoir.

* * * * *